Feb. 10, 1959   M. PANICH   2,873,163
PEN LIFTING AND CHART SUPPORT FOR RECORDING METERS
Filed June 16, 1954   4 Sheets-Sheet 1

INVENTOR.
MICHAEL PANICH
BY
Raymond D. Jenkins
ATTORNEY

Feb. 10, 1959 M. PANICH 2,873,163
PEN LIFTING AND CHART SUPPORT FOR RECORDING METERS
Filed June 16, 1954 4 Sheets-Sheet 2

INVENTOR.
MICHAEL PANICH
BY
Raymond W. Junkins
ATTORNEY

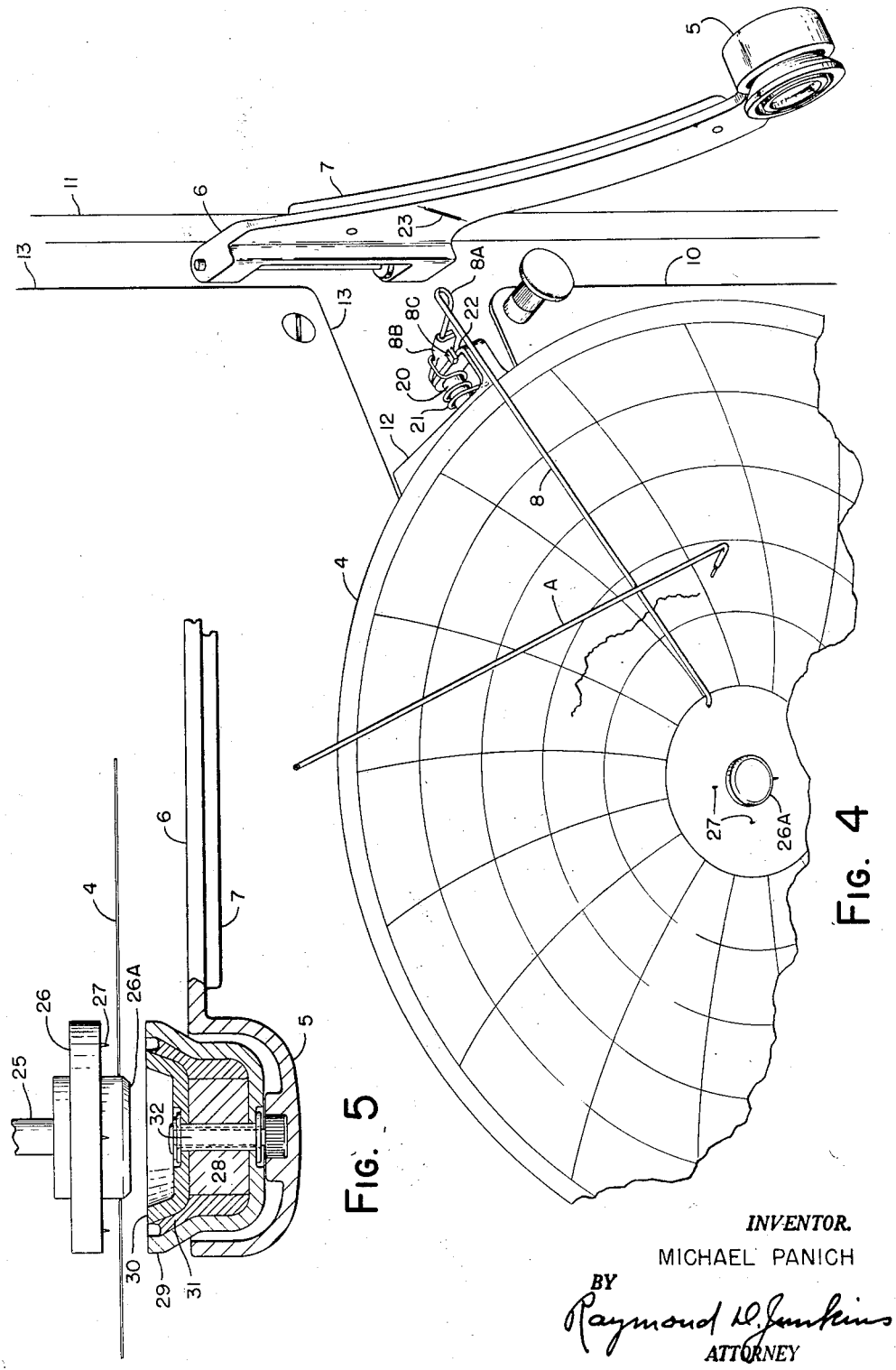

United States Patent Office 2,873,163
Patented Feb. 10, 1959

2,873,163

PEN LIFTING AND CHART SUPPORT FOR RECORDING METERS

Michael Panich, Mayfield Heights, Ohio, assignor to Bailey Meter Company, a corporation of Delaware Application June 16, 1954, Serial No. 437,025

2 Claims. (Cl. 346—68)

The present invention relates to improvements in chart recording meters. More particularly, the invention is concerned with the structure which controls the engagement and disengagement of the recording pen of an industrial measuring instrument with its chart surface. Further, the invention is concerned with an element of the control combination which supports and retains the chart in position while it is moved on a time basis beneath the pens.

Chart recording instruments are familiar devices where measurements of the various factors of industrial processes are to be placed on permanent records. The mediums bearing these records are usually of paper. In form, the paper charts are conventionally either round and designed to rotate once in a predetermined period, or a rectangular strip dispensed from a roll at a predetermined rate. Whichever form of chart paper is used, the recording pens are moved over its surface, actuated by mechanisms continually responsive to the variables to be recorded. The result sought is a continuous, inked, line over the chart time zones which manifests the magnitude of the measured variable at any period.

The preferred embodiment of the present invention is disclosed in connection with a recording instrument designed to utilize a circular chart on which one, or more, pens place their individual records with respect to a common time and scale. The support and retaining element of the combination is applied at the axis of chart rotation, and the pen controlling structure is attached to the instrument case outside the periphery of the chart and extends to the center of chart rotation. The points of the pens move over a radial line of the chart and utilize a common element of the invention for scale purposes.

The invention gives two basic services. First, as circular charts are periodically replaced, the present invention provides simultaneous disengagement of the pens from the chart surface preparatory to stripping the chart from the instrument. Additionally, this provision of the invention facilitates replacement and cleaning of the pens. Secondly, the invention provides simple, yet efficient, means for supporting and retaining the chart in position with respect to the pens. These services of the invention are made available by a single motion manipulation exerted by one hand of operating personnel.

A primary objective of the invention is then generalized as providing engagement and disengagement between pens and chart of a recorder.

Another object of the invention is the provision of support and retention of rotated charts.

Another objective is the provision of pen control and chart support and retention with a minimum of structural elements.

Another objective is to provide manually operable locking structure for the elements of the invention.

Fig. 4 is a perspective of the structure of the invention as viewed from an elevated position, disclosing details of the pen control portion of the invention.

Fig. 5 is a partially sectioned top view disclosing details of the chart support and retaining portion of the invention.

Figure 1:
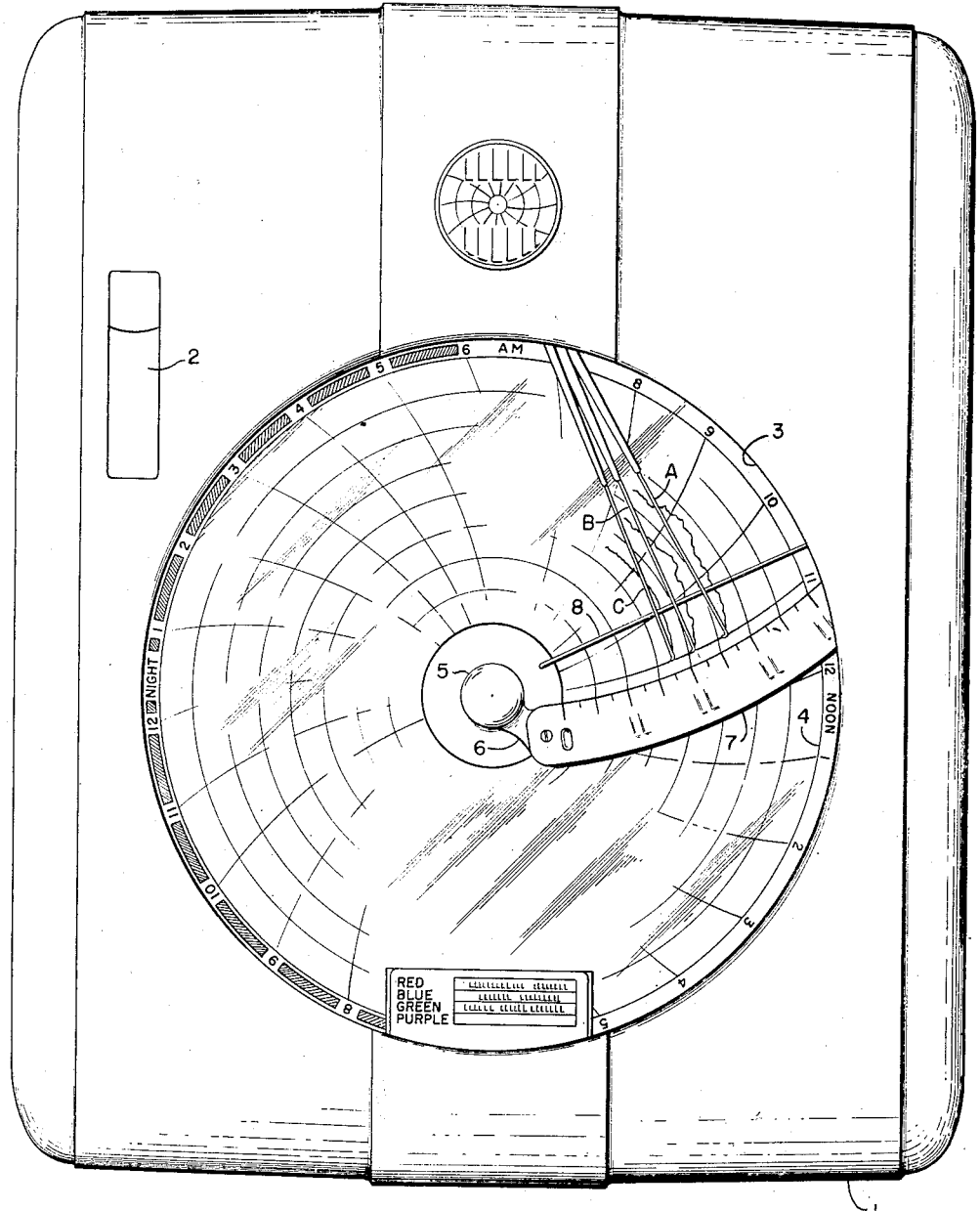
Fig. 1 is a front elevation of a recording meter incorporating the preferred embodiment of the invention.

Taking up the description with Fig. 1, there is disclosed, in front elevation, a circular chart recording meter with the preferred embodiment of the invention incorporation therein. In this drawing the meter is viewed as though mounted permanently upon a panel, or other support structure, manifesting its information to operating personnel. Door 1 absorbs most of the attention as the most prominent visible element of the meter. A latch-handle 2 is carried on the upper left quadrant of the door 1 and the configurations of the door are styled about its large aperture 3. A transparent glass, or plastic, window in aperture 3 permits a view of chart 4 upon which the recording pens of the meter draw their record as the chart is revolved about its axis. The active element of the control structure is viewed in association with the pens, and the chart support and retaining structure is indicated.

Pens A, B and C are pivoted from a common axis not visible in this view as located behind the upper portion of door 1. The marking points of the pens are inclined toward the chart surface at slightly different angles in order to permit tracking of substantially the same radial line without physical interference. Chart 4 need not be described specifically; the chart is conventionally marked with time and magnitude boundaries for interpretation of the records drawn upon the chart surface by the recording pens. Although three pens were arbitrarily selected for disclosure of the first figures of the drawing, it is to be understood that some applications require but a single pen while other applications require as many as four pens. The control feature of the invention operates independently of the number of pens, the active portion contacting all of those present, simultaneously and uniformly.

A hub-handle 5 is indicated at the center of chart rotation. Within, and beneath, this hub-handle is the support and retaining structure of the invention. The hub-handle is styled, and designed, aesthetically, and functionally, for appearance, and grasp by one hand of operating personnel for actuation of the structure of the invention.

A stout arm 6 is connected to hub 5 and arcs across the chart from a hinge not visible, as obscured by the door. A prominent scale 7 is attached to this arm 6. Arm 6 is a very pertinent element of the structural combination by virtue of its forming the physical link between the pen control structure and the chart support and retaining structure. Not only is the lift-bar 8 caused to engage and disengage pens A, B and C from the surface of chart 4 but the useful, common scale 7 is very conveniently located with respect to the pen points for indication of their variable values.

Figure 2:
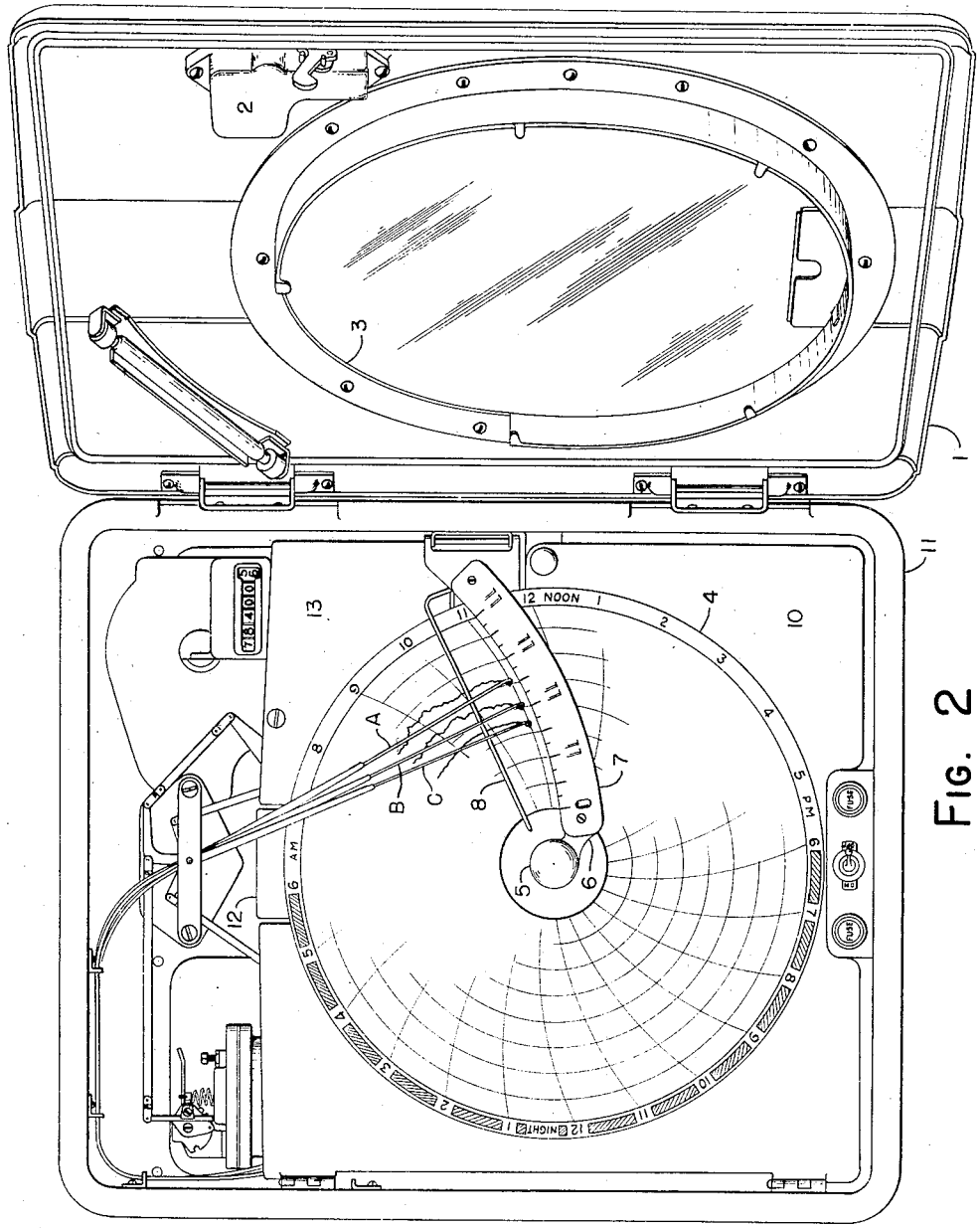
Fig. 2 is a front view of the recording meter of Fig. 1 with the door opened and the invention disclosed in normal position during operation of the meter.

The next step taken to disclose the invention is to show, by Fig. 2, the structure as it appears with door 1 open. This is the view offered personnel as they open the door, preparatory to servicing, or inspecting, the pens, chart, etc. within the housing of the meter.

The door 1 of the meter, seen from its inside, is more clearly disclosed as to its lock housing of latch-handle 2, window held by a frame about aperture 3 and source of illumination arranged to direct light down into the frame. Small projections are arranged about the frame for pressing against the chart 4 around its edges in order to hold against sections 12, 13 and 10 of the chart plate in case 11. Chart 4 has been removed prior to hinged section 10 of the chart plate being swung to the left on its hinges.

It should be particularly appreciated at this time that the chart plate is divided into three sections. As a unit, these three sections cooperate to form a backing for chart 4. Central section 12 not only backs that portion of the chart scribed upon by the pens but provides a mounting for lift-bar 8. Section 13 is somewhat incidental, forming, primarily, a cover for the instrumentalities behind it in the case 11. The three sections are held in a common plane by various support members. Section 10 is hinged from its left and is secured by an elementary type of fastener to a tab structure attached to the case. Various mounting studs from the back wall of case 11 are not in view as they come forward to support scribing section 12 and cover section 13.

Instrument case 11 has unique features itself. Very generally, it may be seen as a box with a back wall defined into quadrants having rectangular apertures. The various features of this case has been the subject of a patent application, along with the various measuring instrumentalities adapted to be mounted in the apertures. No purpose would be served by further general, or specific, reference to these applications at this time. It is sufficient to note that the case is designed to mount various types of measuring instrumentalities interchangeably in each of the quadrants. The problems of bringing wiring and piping to these instrumentalities need not be of concern here.

Thus Fig. 2 serves to bring the hinge of arm 6 into view for the first time and a clear disclosure of the visible components of the invention in their relationship to each other while the complete meter is in operation with the pens A, B and C engaged with the surface of chart 4. Chart 4 is supported and retained by the invention, at its center, by that portion of the structure under hub-handle 5. The points of pens A, B and C are indicating along the arc of scale 7 on arm 6.

Figure 3:
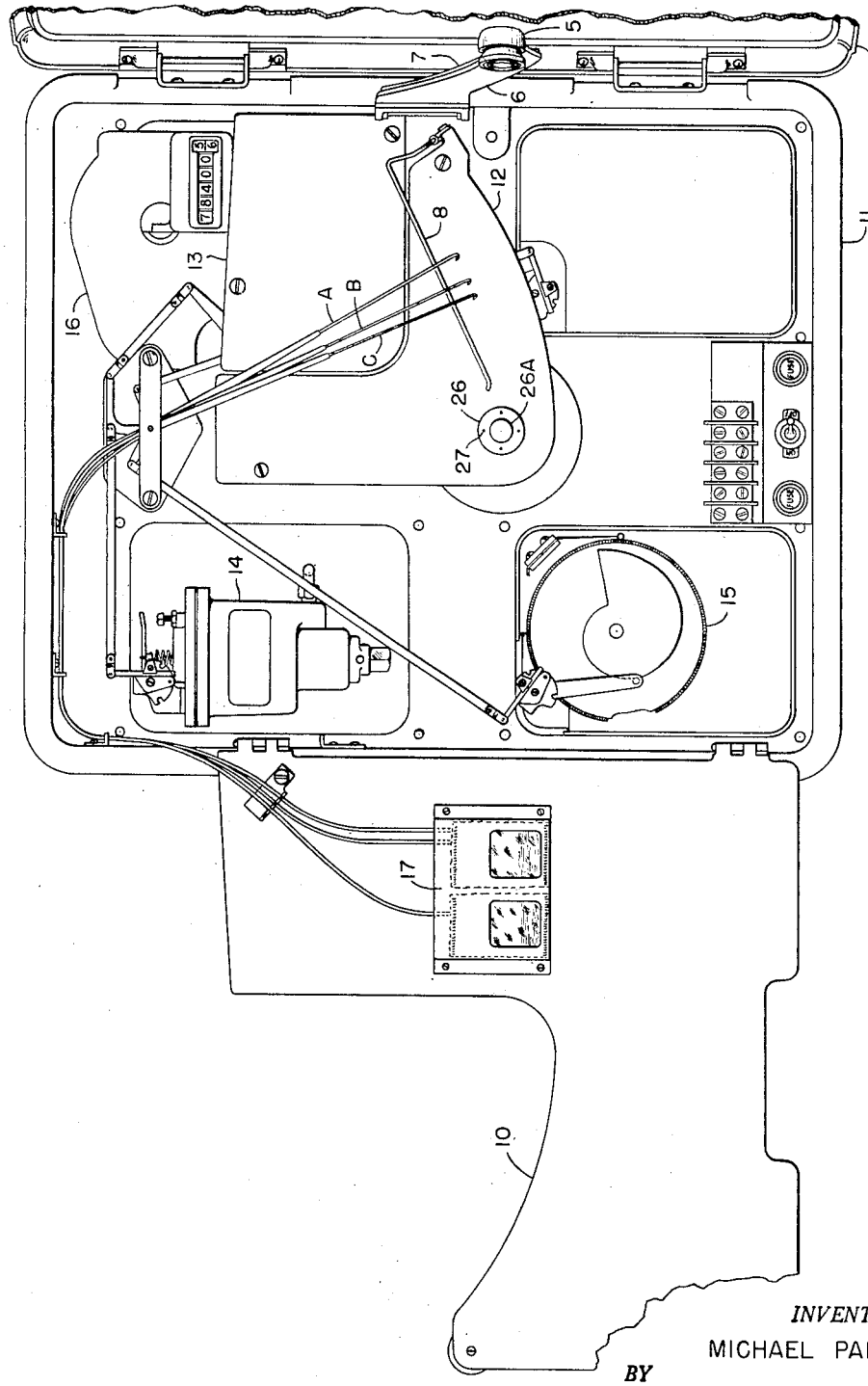
Fig. 3 is a front view of the recording meter of Fig. 1 with the door and a portion of the chart plate leafed open, the chart removed and the invention disclosed in some detail.

The description now shifts to Fig. 3 where the recording instrument of Fig. 1 is disclosed in greater detail by reason of the fact that the door 1 has been swung on its hinges to the right and the hinged section 10 of the chart plate has been swung on its hinges to the left. The limitation of the drawing has necessitated breaking away all but a small section of door 1 and a small portion of one corner of hinged section 10 of the chart plate. However, this leafing of the door and chart plate brings many details of the interior of instrument case 11 into view, along with additional details of the structure of the invention. Hub-handle 5 has been grasped by the hand of operating personnel and the sections of the chart support and retaining structure separated. Arm 6 has been swung back on its hinge, and lift-bar 8 has come forward and elevated pens A, B and C out of contact with the chart surface.

In general, the responsive mechanisms mounted in case 11 are of a pneumatic and electric nature. Only the general outline of these devices have been indicated here. They are utilized to give reference to how the pens of the recorder are actuated in response to variables. Each of these devices have been the subject of patent applications covering features of no specific importance here. Pneumatic receiver 14 embodies a bellows responsive to a pneumatic signal representative of the variable to be recorded. The bellows motion is transmitted by linkage to one of the pens of the instrument. Electronic, or electric, unit 15 embodies a balanceable network whose servo-motor positions a pen of the meter.

It may be re-emphasized at this point that instrumentalities 14 and 15 may be universally mounted in case 11. The linkage to the pens has been designed to permit this interchange by relatively unskilled personnel. Device 16 represents an extension of the types of instrumentalities that may be designed into occupying the quadrant positions of case 11. Device 16, although somewhat obscured in Fig. 2, represents a totalizer of variable rates of flow and similar variables. Generally referred to as an integrator, the specific device designed for the commercial embodiment of case 11 is also the subject of a patent application. The design of linkage in case 11 makes it feasible to actuate the device from one of the variable responsive mechanisms as represented at 14 and 15. The register of integrator 16 is visible when door 1 is open. The manifestations derived from the recorder is now expanded from the scale and chart readings to that of the integrator register.

Certain detail of Fig. 3 is devoted to disclosure of reservoirs for ink supplied to the pens. As disclosed, pens A, B and C are of the capillary type. A relatively small plastic tube conducts ink from individual compartments of reservoirs in a bracket 17 which is secured to the hinged section 10 of the chart plate. Capillary action promotes a continuous flow of ink through these tubes to the points of the pens. This arrangement, also, has been the subject of a patent application.

Regardless of the specific novelty that may reside in the various measuring instrumentalities, integrator, capillary pens and the instrument case 11 itself, the present structure is concerned with the control of the pens in so far as their engagement and disengagement with the surface of chart 4 and the support and retention of the chart 4 at its axis is considered. The mounting station of lift-bar 8 on scribing section 12, the centralized location of the mounting and retaining structure for the chart and the hinged station for the bar-arm 6 are to be noted in relationship to the other components of case 11. The structural combination of the invention is bound together, by the components of the measuring instrument, at these stations. The result is thorough integration of this preferred embodiment of the invention with the recording instruments in the fulfillment of the objectives of the invention.

Fig. 4 may now be utilized to highlight specific details of the pen control portion of the structure of the invention. The view of the mechanism is taken from above that of the prior views in order to more clearly observe the details. Only a single pen, pen A, is utilized to demonstrate this function of the invention. In Fig. 4, chart 4 is clearly in evidence, along with hinged section 10, scribing section 12 and cover section 13 of the chart plate. The scribing section 12 is cut so as to expose the mounting of lift-bar 8 to a view from the front. The enlarged view of hinged arm 6 permits still another view of scale 7 attached thereto and the support-retaining structure carried in the interior of hub 5. The specific details of this structure within hub 5 is more competently described in connection with Fig. 5. It is sufficient to generally note that arm 6 swings between its position, shown in Fig. 4, to engagement of the structure within hub 5 with the support-retaining structure at the center of chart 4, as shown in Fig. 2.

The operation of the lift-bar 8 in control of the recording pens is quite simple to follow in Fig. 4. The ultimate objective is to move lift-bar 8 outwardly from the surface of chart 4, engage the staff of pen A at a point intermediate its pivot and tip, and lift pen A from engagement with the surface of chart 4. The simple specification to be met is that lift-bar 8 should be carried out from the surface of chart 4 while maintained substantially parallel thereto. The maintenance of this relationship will reduce the possibility of applying a side-wise force on the staff of pen A in opposition to that of its responsive mechanism. Obviously, a positive stop must be provided to limit the outward movement of lift-bar 8.

Lift-bar 8 should be closely observed in Fig. 4. Despite the heretofore unitary reference to this member, it is actually in two physical pieces. However, for the purpose of this description, it will be regarded as a single member with three functional sections. The elongated, active, section bears the primary reference number 8. The length of this active section may be traced back from the recording pens under which it lies, to trigger section 8A and pivot section 8B. Trigger section 8A is actually a bend of a particular shape in the extension of the active section. Pivot section 8B is actually a plate attached to the active and trigger sections and having a hole which accommodates a shaft in order that pivoting action may be provided from a fixed point and a protuberance 8C to limit the pivot action. In general, spring force pivots the entire lift-bar 8 in one direction around the shaft while a force exerted against trigger section 8A rotates the entire bar against the spring force in the opposite direction. Protuberance stop 8C makes contact with an edge of chart plate scribing section 12.

The second element of the combination may be regarded as shaft 20 about which lift-bar 8 pivots. This shaft is mounted on the chart plate scribing section 12. It must be appreciated that first a protuberance of scribing section 12 is bent inwardly at a right angle to the chart plate surface. Shaft 20 is then mounted on this protuberance, parallel with the chart plate surface, and behind it. Pivot section 8B of lift-bar 8 is carried by this shaft 20, on one side of the protuberance, and holds lift-bar 8 above the surface of the chart plate. Pivoting section 8B in one direction about shaft 20 permits the pens to engage the chart surface. As section 8B is pivoted in the other direction, protuberance stop 8C contacts scribing section 12 at point 22 on its edge, limiting rotation and fixing the amount of pen elevation above chart 4.

Spring 21 is a third element of the combination and is coiled about shaft 20, with one end looped over the pivot section 8B and the other end resting on the under side of scribing section 12. Thus arranged, the spring will always exert a force to urge the pivot section of lift-bar 8 toward its positive stop position with 8C against point 22 on scribing section 12.

Hinged arm 6 is the fourth element of the combination. Arm 6 is hinged on case 11 to swing toward and away from the chart plate. As the arm is swung toward the chart plate, contact is made between its surface, along a line 23, and trigger section 8A of lift-bar 8. Trigger section 8A is deliberately shaped to engage arm 6 along line 23 and to maintain the engagement through the remainder of the swing of arm 6 of its anchor position, overcoming the force of spring 21. It is obvious, that as trigger section 8A is pressed toward the chart plate, by the force moving arm 6, the active section of lift-bar 8 is carried down, and against, the surface of chart 4. This movement, of course, allows the recording pens to be lowered into engagement with the surface of chart 4.

Attention may now be turned to the fifth element of the combination, comprising the chart holding and retaining structure associated with the hub-handle 5. In one sense, acting within the pen control combination, the mechanism associated with hub 5 serves to anchor arm 6 at the axis of rotation of chart 4 to permit engagement of the recording pens with the surface of chart 4. Separation of hub-handle 5 from the center of chart rotation and the swing of arm 6 outward, allows the active portion of lift-bar 8 to disengage the recording pens from the surface of chart 4, under the force of spring 21. Thus is provided an extremely simple, automatic pen control structure which functions by operating personnel simply grasping hub-handle 5 and pulling it outward from case 11. The outward swing of arm 6 allows spring 21 to rotate lift-bar 8 to the limit fixed by the position of the stop protuberance on pivot section 8B as it contacts the edge of scribing section 12. With the combination in the position illustrated in Fig. 4, the pens are disengaged from the surface of chart 4 and chart 4 may be stripped from the meter, the pens cleaned or replaced, and the objects of the invention attained.

The attention of the description may now be concentrated upon the unique structure employed in connection with hub-handle 5. The first four figures of the drawing depict this structure only in sufficient detail to emphasize its location and function as a means for anchoring the unhinged end of arm 6. The partially sectioned view of Fig. 5 shows the structure to be a complete, efficient and simple chart support and retaining mechanism.

Very generally, the chart supporting and retaining mechanism disclosed in Fig. 5 is comprised of two sections. The one section is rotated by a motor fixed to case 11 and the other section is carried within hub-handle 5 on arm 6. The two sections are attracted toward each other by a magnetic force which can be overcome by the pull exerted by operating personnel. When engaged by magnetic force, the two sections cooperate to form both a support and retaining mechanism for chart 4 as well as an anchor for the end of bar 6. With thumb and forefinger, an operator can grasp hub-handle 5 and pull it toward him. Disengagement of the recording pens from the chart surface is accomplished and, chart 4 may then be stripped from the meter with ease.

From the foregoing generalizations, the description now carries specifically to Fig. 5. There are certain specifications which must be met by the function and form of this supporting and retaining structure. First, the structure must support the chart and retain it in an operative position with respect to the pens. Second, the structure must permit the chart to rotate freely from a motor turning it with the respect to time. Third, the structure must retain arm 6 against the trigger section of 8A of lift-bar 8 in opposition to the force of spring 21. Fourth, it must be possible to separate the two portions of the structure, manually, with relatively little effort. Finally, the structure must be constructed of a minimum number of easily machined, assembled and adjusted parts. It will be appreciated, as the description is completed, that all of the functions and specifications required of the structure are met.

A logical analysis of the structure of Fig. 5 begins with an appreciation that chart 4 is revolved by some type of motor, conventionally powered by spring, electric or pneumatic force. Whatever the type of motor provided, shaft 25 is turned by the motor and a chart clamp body 26, of magnetically attractive metal, is mounted on the end of this shaft.

Chart clamp body 26 is step-turned to present, to the chart center hole, a boss 26A over which the chart 4 fits snugly. It is the shoulder surface from which the boss 26A protrudes which is aligned with the plane of the chart plate sections. It is against this shoulder surface that the chart is carried for support and retention.

Note is to be taken of a series of pins 27 carried in drilled holes, in the shoulder surface, around the boss 26A. As chart 4 is carried back against the shoulder surface, these pins will penetrate chart 4, supporting and retaining the chart in position.

Turning now to the structure within hub 5, the structure is disclosed which presses the chart against the shoulder of body 26. Essentially, this structure is a magnet, rotatable within hub 5. The magnet has sufficient force of attraction for body 26 to force chart 4 onto the shoulder of body 26, driving pins 27 through the chart surface.

The magnetic section is generally disclosed as an air-gap type of magnet. The core of the structure is a very strong, torodial magnet body 28. Steel shell 29 holds the magnet centrally and steel shell 30 completes the capture of the magnet between the shells. The shells are of different diameters, and, with the magnet captured between them, have their edges brought to the plane common with the shoulder of body 26. Binding of the shells and magnet is completed into a single unit by filling the remaining space between the shells with a nonmagnetic body of soft solder 31. The pins in the shoulder of body 26 are aligned to fall in the space between the two shells 29 and 30. A small portion of the solder is removed to accommodate the points of the pins. A hole is formed centrally of the shells and magnet. A simple eyelet member is threaded through this hole and flanged on either end to form a tube which accommodates a rivet which is firmly pressed into a junction with an internal recess in hub 5. The diameter of the rivet is selected to permit the entire magnet body to rotate easily within hub 5.

When the magnet structure within hub 5 is brought against the shoulder surface of body 26, even through the thickness of chart paper, the attraction is strong enough to force chart 4 flush against the shoulder surface of 26, causing pins 27 to penetrate through the surface of the chart. The resulting union between body 26 and the magnet both supports and retains chart 4 in operative relationship with the recording pens. Strong as this force may be between the magnetic structure and body 26, for the purposes of supporting and retaining chart 4, it can be manually overcome by operating personnel grasping hub-handle 5 between thumb and forefinger and exerting a pull of moderate strength. When the union is terminated, arm 6 is swung outward of the case and trigger section 8A of lift-bar 8 follows arm 6 until it reaches the limit fixed by the stop of pivot section 8B against the scribing section 12 of the chart plate. This motion of lift-bar 8, of course, disengages recording pens A, B and C from the surface of chart 4.

Considering the functions and objectives achieved by the complete combination of the invention, the structure is quite simple. By having arranged arm 6 to actuate the pen controlling mechanism and carry the magnet portion of the chart support and retention mechanism, the two functions and structure are consolidated. The result is that the entire combination may be actuated by one manual movement exerted by operating personnel. Finally, in addition to forming a mechanical link between the two sections of the combination, arm 6 forms a convenient base upon which scale 7 may be mounted, common to all of the recording pens, for the purpose of giving an indication of the variables measured.

What I claim as new, and desire to secure by Letters Patent of the United States, is:

1. A recording instrument, comprising, an instrument casing, a motor-driven shaft for a circular chart mounted on said casing for rotation relative thereto, a chart clamp body of magnetically attractive material carried on the end of said motor-driven shaft and having a seating surface for the chart, a marking pen engageable with the chart and having an elongated arm pivotally mounted at one end thereof at a position outwardly of the periphery of the chart, a lift bar pivotal toward and away from said chart substantially in a plane perpendicular thereto, said lift bar underlying said pen arm and engageable therewith upon pivotal movement to move said pin out of engagement with the chart, pivot means for said pivotal lift bar positioned outwardly of the periphery of the chart, spring means associated with said pivot means to urge said lift bar toward an outward position away from the chart, a hinged arm pivoted at one end on an axis parallel to the plane of the chart, a hand-operated chart clamping hub rotatably mounted on the other free end of said hinged arm for engaging and applying a clamping pressure to the chart on the chart seating surface upon pivotal movement of said hub into engagement with the chart, said clamping hub having a magnetic body mounted therein adapted to be magnetically attracted to said clamping body, and an abutment on said lift bar adapted to be engaged by said hinged arm upon pivotal movement thereof toward the chart to pivot said lift bar toward the chart against the bias of said biasing means to move the same out of engagement with said pen arm, said hinged arm being movable out of engagement with said abutment upon outward movement thereof away from the chart to release said lift bar and effect pivotal movement of said lift bar under said bias to lift said pen out of engagement with the chart.

2. A recording instrument, comprising, an instrument casing, a motor-driven shaft for a circular chart mounted on said casing for rotation relative thereto, a chart clamp body of magnetically attractive material carried on the end of said motor-driven shaft and having a seating surface for the chart, a marking pen engageable with the chart and having an elongated arm pivotally mounted at one end thereof at a position outwardly of the periphery of the chart, a lift bar pivotal toward and away from the chart substantially in a plane perpendicular thereto, said lift bar underlying said pen arm and engageable with said pen arm upon pivotal movement thereof to move the same out of engagement with the chart, stop means engageable by said lift arm for limiting pivotal movement thereof away from the chart, pivot means for said pivotal lift bar positioned outwardly of the periphery of the chart, spring means associated with said pivot means to urge said lift bar toward an outward position away from the chart, a hinged arm pivoted at one end on an axis parallel to the plane of the chart, a hand-operated chart clamping hub of annular shape rotatably mounted on the other free end of said hinged arm for engaging and applying clamping pressure to the chart on the chart seating surface upon pivotal movement into engagement with the chart, said clamping hub having a magnetic body mounted therein adapted to be magnetically attracted to said clamping body, and an abutment on said lift bar adapted to be engaged by said hinged arm upon pivotal movement of said hinged arm toward the chart to pivot said lift bar toward the chart against the bias of said biasing means to move the same out of engagement with said pen arm, said hinged arm being movable out of engagement with said abutment upon outward movement thereof away from said chart to release said lift bar and effect pivotal movement of said lift bar under said bias to lift said pen out of engagement with the chart.

References Cited in the file of this patent

UNITED STATES PATENTS

| | | |
|---|---|---|
| 1,285,919 | Brown | Nov. 26, 1918 |
| 1,811,417 | Bristol | June 23, 1931 |
| 2,119,950 | Cunningham | June 7, 1938 |
| 2,475,573 | Smith et al. | July 5, 1949 |
| 2,501,604 | Jordan | Mar. 21, 1950 |
| 2,573,950 | Bowditch | Nov. 6, 1951 |
| 2,746,832 | Bakeslee | May 22, 1956 |